US008078553B2

(12) United States Patent
Strassner et al.

(10) Patent No.: US 8,078,553 B2
(45) Date of Patent: Dec. 13, 2011

(54) AUTOMATIC TRANSLATION OF CONTRACTS TO POLICIES IN POLICY-BASED NETWORKS

(75) Inventors: John C. Strassner, North Barrington, IL (US); Gregory W. Cox, Schaumburg, IL (US); David L. Raymer, Jr., Watauga, TX (US)

(73) Assignee: Motorola Mobility, Inc., Libertyville, IL (US)

( * ) Notice: Subject to any disclaimer, the term of this patent is extended or adjusted under 35 U.S.C. 154(b) by 838 days.

(21) Appl. No.: 12/163,323

(22) Filed: Jun. 27, 2008

(65) Prior Publication Data

US 2009/0327179 A1 Dec. 31, 2009

(51) Int. Cl.
*G06N 5/00* (2006.01)
(52) U.S. Cl. ............................................ 706/12; 706/45
(58) Field of Classification Search .................... 706/12, 706/45
See application file for complete search history.

(56) References Cited

U.S. PATENT DOCUMENTS

| 6,442,750 | B1 | 8/2002 | Lopes et al. |
| 7,278,156 | B2 | 10/2007 | Mei et al. |
| 2008/0147698 | A1 | 6/2008 | Gustafsson et al. |

OTHER PUBLICATIONS

Dengiz, et al, Genetic Algorithm Design of Networks Considering All-Terminal Reliability, Proceedings of the 6th Industrial Engineering Research Conference, 1997, pp. 1-6.*
Sleem, et al., Comparative Study of Parallel vs. Distributed Genetic Algorithm Implementation for ATM Networking Environment, ISCC '00 Proceedings of the Fifth IEEE Symposium on Computers and Communications, 2000, pp. 152-157.*
Jeon, Young Hai: "The International Search Report and the Written Opinion of the International Searching Authority", Korean Intellectual Property Office, Daejeon, Republic of Korea, completed: Jan. 28, 2010, mailed Feb. 1, 2010, all pages.

* cited by examiner

*Primary Examiner* — Wilbert L Starks

(57) ABSTRACT

A system, method, and information processing system manage a network. At least one contract including one or more components is received at a network that uses a component based architecture. A first operation (422) in the set of operations associated with the contract (114) is mapped to a policy rule event (424) associated with at least one policy rule (116). A second operation (426) in the set of operations associated with the contract (114) is mapped to at least one policy rule condition (428) associated with the policy rule (116). A third operation (430) in the set of operations associated with the contract (116) is mapped to a policy rule action (432) associated with the policy rule (116). A fourth operation (440) in the set of operations associated with the contract (116) is mapped to a policy rule condition (442) associated with the other policy rule (420).

13 Claims, 9 Drawing Sheets

US 8,078,553 B2

AUTOMATIC TRANSLATION OF CONTRACTS TO POLICIES IN POLICY-BASED NETWORKS

FIELD OF THE INVENTION

The present invention generally relates to the field of network monitoring and management, and more particularly relates to managing networks implementing program-by-contracts using policy-based techniques.

BACKGROUND OF THE INVENTION

Design by Contract ("DBC") enables software developers to produce, at minimal extra cost, software that is inherently more reliable than would otherwise be constructed. The basis of design-by-contract/program-by-contract is the specification of obligation in terms of the service, the servant (the entity offering the service) and the service consumer. The obligations of the service consumer are defined by preconditions; the obligations of the service itself are defined by post-conditions; and the obligations of the servant are defined by the class invariants. DBC was first introduced in Meyer, B., "Object Oriented Software Construction", Prentice-Hall Publishers: 1988, which is hereby incorporated by reference in its entirety.

Components within component based software contain the implementation of functionality that corresponds to one or more given contracts. In general, the vast majority of implementation languages do not provide any direct support for the concept of design-by-contract/program-by-contract. Furthermore, even if an implementation language does provide direct support for program-by-contract, this support is of a static nature, that is, support for pre-conditions, post-conditions and invariants ("PP&I") specified during the development cycle.

Within a large scale distributed system, only the most simplistic of PP&I are identifiable during the development cycle. The more detailed PP&I that are required to ensure a robust and reliable system are often dependent on business drivers and system constraints that are simply not predictable during development. For example, the amount of bandwidth that must be available in order to initiate a particular type of multimedia stream is based on guarantees made to the customer by the service provider, which in turn is dependent on the plan chosen by the customer. This is the quintessential example of detailed PP&I that cannot be predicted by engineers or system administrators in a static fashion.

This leaves the operator of any given large scale distributed system (such as the operator of a traditional information communication or telecommunications, or ICT, network) balancing a system that is not easily extended due to the limited flexibility and reliability of the software supporting a feature-oriented service model. There is tremendous interest within the ICT community in moving to a component based model that enables the deployment of flexible and general services that are then composed through an orchestration mechanism to provide the services and products being demanded by network subscribers. Current solutions in this space still suffer from massive integration efforts that result in a substantial delay to the deployment of new services and applications; where the service provider/network operator wants to roll out services in days or weeks, the current systems still require months, or in some extreme cases, years.

Therefore a need exists to overcome the problems discussed above.

SUMMARY OF THE INVENTION

In one embodiment, a method for managing a network is disclosed. At least one contract including one or more components is received at a network that uses a component based architecture. The contract is a collection of fundamental behaviors with each behavior being further refined and/or protected by a set of operations associated with the contract. A first operation in the set of operations associated with the contract is mapped to a policy rule event associated with at least one policy rule. A second operation in the set of operations associated with the contract is mapped to at least one policy rule condition associated with the policy rule. A third operation in the set of operations associated with the contract is mapped to a policy rule action associated with the policy rule. The policy rule action triggers an implementation of at least one other policy rule. The policy rule action is associated with the policy rule event of the other policy rule. A fourth operation in the set of operations associated with the contract is mapped to a policy rule condition associated with the other policy rule.

In another embodiment, an information processing system for managing a network is disclosed. The information processing system includes a memory and a processor that is communicatively coupled to the memory. A network manager is communicatively coupled to the memory and the processor. The network manager is adapted to receiving, at a network that uses a component based architecture, at least one contract including one or more components. The contract is a collection of fundamental behaviors with each behavior being further refined and/or protected by a set of operations associated with the contract. A first operation in the set of operations associated with the contract is mapped to a policy rule event associated with at least one policy rule. A second operation in the set of operations associated with the contract is mapped to at least one policy rule condition associated with the policy rule. A third operation in the set of operations associated with the contract is mapped to a policy rule action associated with the policy rule. The policy rule action triggers an implementation of at least one other policy rule. The policy rule action is associated with the policy rule event of the other policy rule. A fourth operation in the set of operations associated with the contract is mapped to a policy rule condition associated with the other policy rule.

In yet another embodiment, a system for managing a network is disclosed. The system includes at least one network that uses a component based architecture. At least one client system is communicatively coupled to the network. At least one information processing system is communicatively coupled to the network and the client system. The information processing system includes a memory and a processor that is communicatively coupled to the memory. A network manager is communicatively coupled to the memory and the processor. The network manager is adapted to receiving, at a network that uses a component based architecture, at least one contract including one or more components. The contract is a collection of fundamental behaviors with each behavior being further refined and/or protected by a set of operations associated with the contract. A first operation in the set of operations associated with the contract is mapped to a policy rule event associated with at least one policy rule. A second operation in the set of operations associated with the contract is mapped to at least one policy rule condition associated with the policy rule. A third operation in the set of operations associated with the contract is mapped to a policy rule action associated with the policy rule. The policy rule action triggers an implementation of at least one other policy rule. The policy rule action is associated with the policy rule event of the other policy rule. A fourth operation in the set of operations associated with the contract is mapped to a policy rule condition associated with the other policy rule.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

DETAILED DESCRIPTION

As required, detailed embodiments of the present invention are disclosed herein; however, it is to be understood that the disclosed embodiments are merely examples of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically.

General Operating Environment

Figure 1:
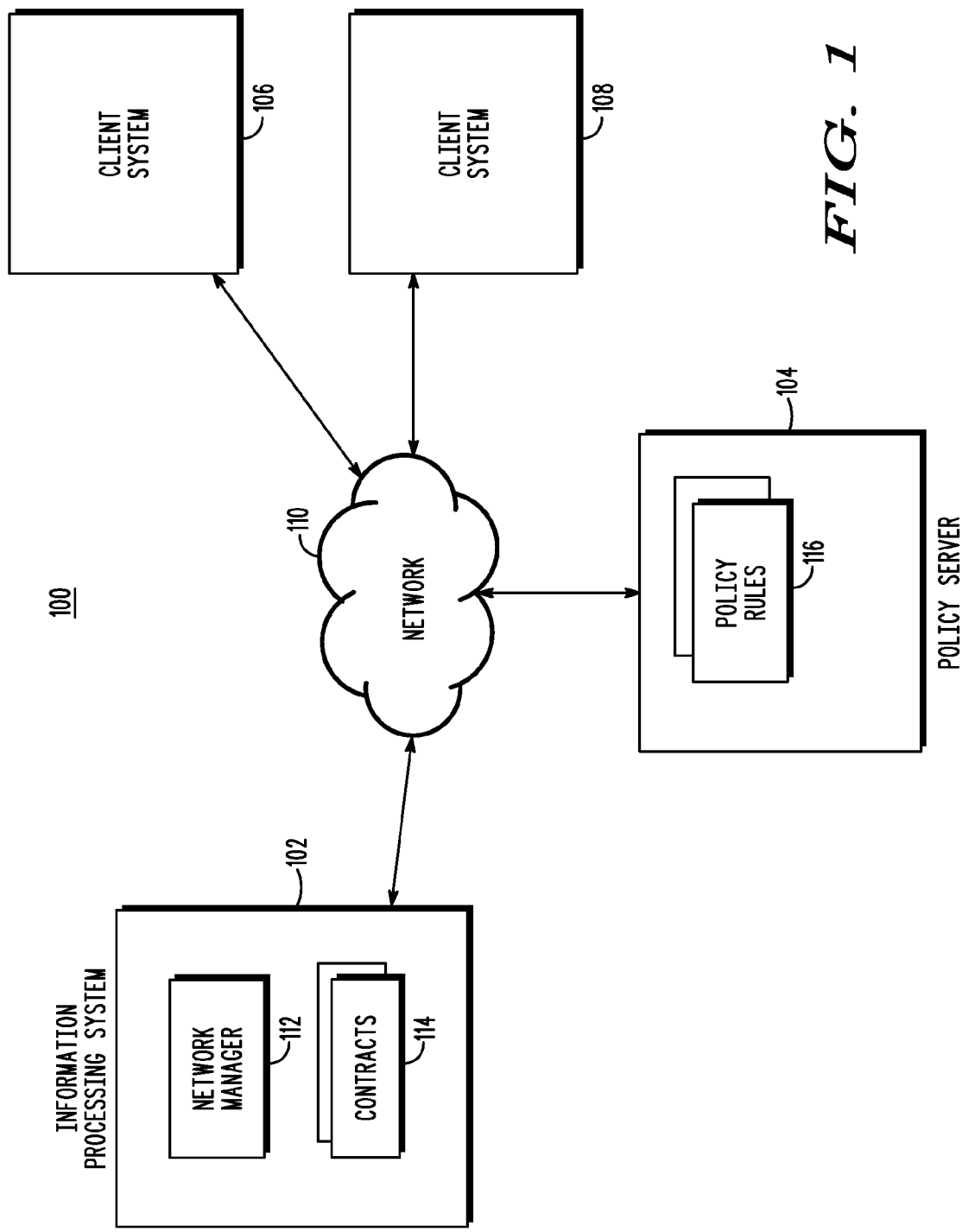
FIG. 1 is a block diagram illustrating a general overview of an operating environment according to one embodiment of the present invention.

According to one embodiment of the present invention as shown in FIG. 1 a general view of an operating environment 100 is illustrated. In particular, the operating environment 100 includes one or more information processing systems 102 communicatively coupled to one or more policy servers 104 and client systems 106, 108. The client systems 106, 108, in one embodiment, access a service(s) and/or application(s) provided by the information processing system 102. The information processing system 102 is communicatively coupled to the policy server 104 and the client systems 106, 108 via one or more networks 110, which can comprise wired and/or wireless technologies.

The information processing system 102, in one embodiment, includes a network manager 112, one or more program-by-contracts 114 herein referred to as "contracts 114". The policy server 104 includes a plurality of policy rules 116. Policy rules 116 are used by the network manager 112 to control almost all aspects of the functionality of components, devices, and systems that are governed by policy. Policy rules 116 comprise associated components (i.e. Policy Events, Policy Conditions, Policy Actions, and Metadata) that are defined as an object or set of objects that are part of a policy rule. The Events (that trigger the policy), the Conditions (that determine if actions are to be taken), and the Actions, in one embodiment, are specified as different components of the policy 116 and can be stored in repositories (not shown) that are separate from the policy-server 104. A policy rule 116 is an intelligent container (See for example page 64 of Strassner, John C.: "Policy Based Network Management", San Francisco: Morgan Kaufmann Publishers, 2004, which is hereby incorporated by reference in its entirety). A more detailed discussion on policy rules and their associated components can be found in Strassner, J., "Policy-Based Network Management", Morgan Kaufman Publishers: 2003, ISBN 1-55860-859-1 and U.S. application Ser. No. 11/961,306, filed Dec. 20, 2007, entitled "Creating Policy Rules and Associated Policy Rule Components" (which is commonly herewith by Motorola, Inc.), both of which are hereby incorporated by reference in their entireties.

The network manager 112, in one embodiment, ensures the reliability of functionality within a computing environment through the application of policy-based techniques to implement a contract 114 in a manner that is independent of application domain, programming language (or languages), and operating system (or operating systems). The network manager 112 allows the automated translation of contracts 114 to policies 116, which can then in turn be translated into a programming language (or languages), allowing business users to more directly control systems supporting their business. Stated differently, the network manager 112 enables existing implementation and deployment technologies, such as (but not limited to) JEE, .NET, and CCM, to make use of design (or program) by contract through the application of policy-based techniques to ensure the reliability and availability of service while also enabling a component oriented, contract-based marketplace that supports conception to deployment cycles of days and weeks, instead of months and years. This functionality of the network manager 112 is discussed in greater detail below.

Automatic Translation of Contracts to Policies

As discussed above, DBC was first introduced in Meyer, B., "Object Oriented Software Construction", Prentice-Hall Publishers: 1988. Conceptually, DBC adds assertions to object-oriented programs at the design and implementation stages. Meyer defined three types of assertions: preconditions (specifies what must be true for a method to be called), post-conditions (specifies what will become true when the method successfully completes), and invariants (which are represented as an assertion that must hold true on instance creation, as well as before and after any invocation of a method of the class). The invariant assertion is used to define the condition (or conditions) of stable state for the class to which the invariant is held.

As originally defined in Meyer, B., "Object Oriented Software Construction", Prentice-Hall Publishers: 1988, Meyer did not include a prescription of responsibility or behavior when preconditions were not met prior to an invocation of the service by a service consumer. Subsequent development of the design-by-contract/program-by-contract concept resulted in the introduction of the concept of exceptions to deal with the situations of preconditions not being met, as well as the situation of the preconditions being met yet the servant is unable to guarantee the post-conditions will be met.

Historically, design-by-contract has been given greater coverage in literature and practice than the corresponding implementation concept of program-by-contract. This is due to the fact that previous implementations of the program-by-contract mechanism relied on programming language support. The various embodiments of the present invention implement program-by-contracts in a way that does not require a programming language that has explicit support for the concepts of preconditions, post-condition, invariants, or exceptions.

Fundamentally, the concept of design-by-contract/program-by-contract is based on the establishment of conditions under which an invocation of functionality can be made and the establishment of the results that said invocation guarantees if the conditions for invocation are met. This can be formulated in natural language as "if (and only if) you promise to ensure that the specified pre-conditions are met, then the implementation guarantees to provide this functionality." This formulation is quite analogous to business contracts and therefore natural to business users.

As discussed above, components within component based software contain the implementation of functionality that corresponds to one or more given contracts. A detailed discussed of component based software is given in Szyperski, C., "Component Software", Addison-Wesley Publishers (ACM Press): 1999, ISBN 0-201-17888-5, which is hereby incorporated by reference in its entirety. Szyperski identifies three fundamental qualities of components: (1) A component is a unit of independent deployment; (2) A component is a unit of $3^{rd}$ party composition; and (3) A component possesses no persistent state.

The last qualification (3) can be restated as the requirement for indistinguishable copies of a given component. In many current systems components are heavyweight entities that deliver functionality. For example, many people view a database server as a component. According to Szyperski, the 'instance' of the database server is not the component; rather, the static program or programs that exist on within a file system is the component. The separation of the immutable plan (the program image within the file system) from the mutable image (the database server processes running in memory) avoids predictability, maintainability, and operability issues resulting from the fact that if the mutable program is the component, no two components can be said, or proven, to be the same. The qualification of components possessing no persistent state is critical for highly available component-based systems.

Formally, Szyperski defines a component as follows: "In the context of this book always a software component. A component is a unit of composition with contractually specified interfaces and explicit context dependencies only. Context dependencies are specified by stating the required interfaces and acceptable execution platform(s). A component can be deployed independently and is subject to composition by third parties. For the purposes of independent deployment, a component needs to be a binary unit. To distinguish between the deployable unit and the instances it supports, a component is defined to have no mutable persistent state. Technically, a component is a set of atomic components, each of which is a module plus resources."

At a high level, a contract-defined interface ("CDI") consists of some number of invocations. See ISO/IEC, "Information technology—Open Distributed Processing—Reference model: Overview", ISO/IEC 10746-1: 1998 (E), which is hereby incorporated by reference in its entirety. For any invocation, there is an associated set of pre-conditions (which may be shared between invocations), and an associated set of terminations (See ISO/IEC reference above). For each termination associated with an invocation, there are a set of associated precondition references/specifications that indicate the conditions that will cause the termination in question to be reached, along with a set of post-conditions (guarantees) made by said termination. A set of invariants are defined that must hold true before each invocation and its associated termination. All invocations and terminations share a common abstract termination exception that results when any of the above three stipulations are violated.

The various embodiment of the present invention presupposes the existence of a distributed middleware environment that supports a component-based model; contemporary examples of such environments include, but are not limited to, Java™ Enterprise Edition ("JEE"), Microsoft®.NET (".NET") and the OMG CORBA Component Model ("CCM"). Such environments are collectively referred to as component execution environments ("CEE"). The details of what qualifies an environment as component-based or not is well documented in the literature. For example Szyperski, C., "Component Software", Addison-Wesley Publishers (ACM Press): 1999. ISBN 0-201-17888-5 is describes component-based environments and is hereby incorporated by reference in its entirety.

Figure 2:
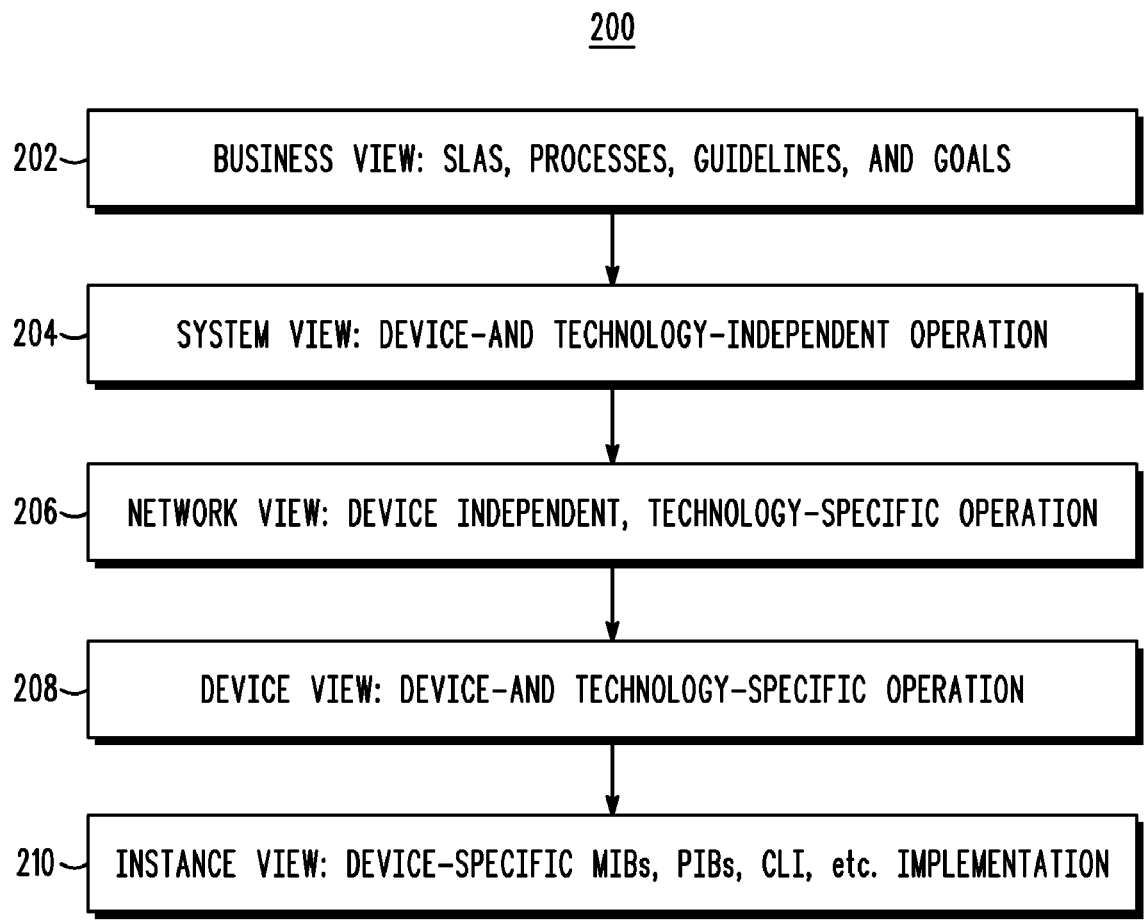
FIG. 2 is an overview of policy continuum according to one embodiment of the present invention.

As discussed above, he network manager 112, in one embodiment, ensures the reliability of functionality within a computing environment through the application of policy-based techniques to implement a contract 114 in a manner that is independent of application domain, programming language (or languages), and operating system (or operating systems). Policy-based management as discussed in Strassner, J., "Policy-Based Network Management", Morgan Kaufman Publishers: 2003, ISBN 1-55860-859-1, is hinged on two key concepts; the policy continuum and policy expressed in the form of rules that are represented in an event-condition-action form. The policy continuum defines a layered approach to the representation of policy, starting with a high-level business oriented point-of-view and leading down through successive layers to a highly detailed instance (runtime) view. The policy continuum is illustrated in FIG. 2.

Each level 202, 204, 206, 208, 210 in the policy continuum 200 addresses a different type of user that has a different understanding of the shared entities operating at that particular level of abstraction. For example, the business view provides a description of business entities, such as customer, service, and Service Level Agreement (SLA), in business terms. The system view uses these same entities, but adds detail that is not appropriate at the business level. In addition, the system level may introduce additional entities to support one or more business processes defined at the business level.

Figure 3:
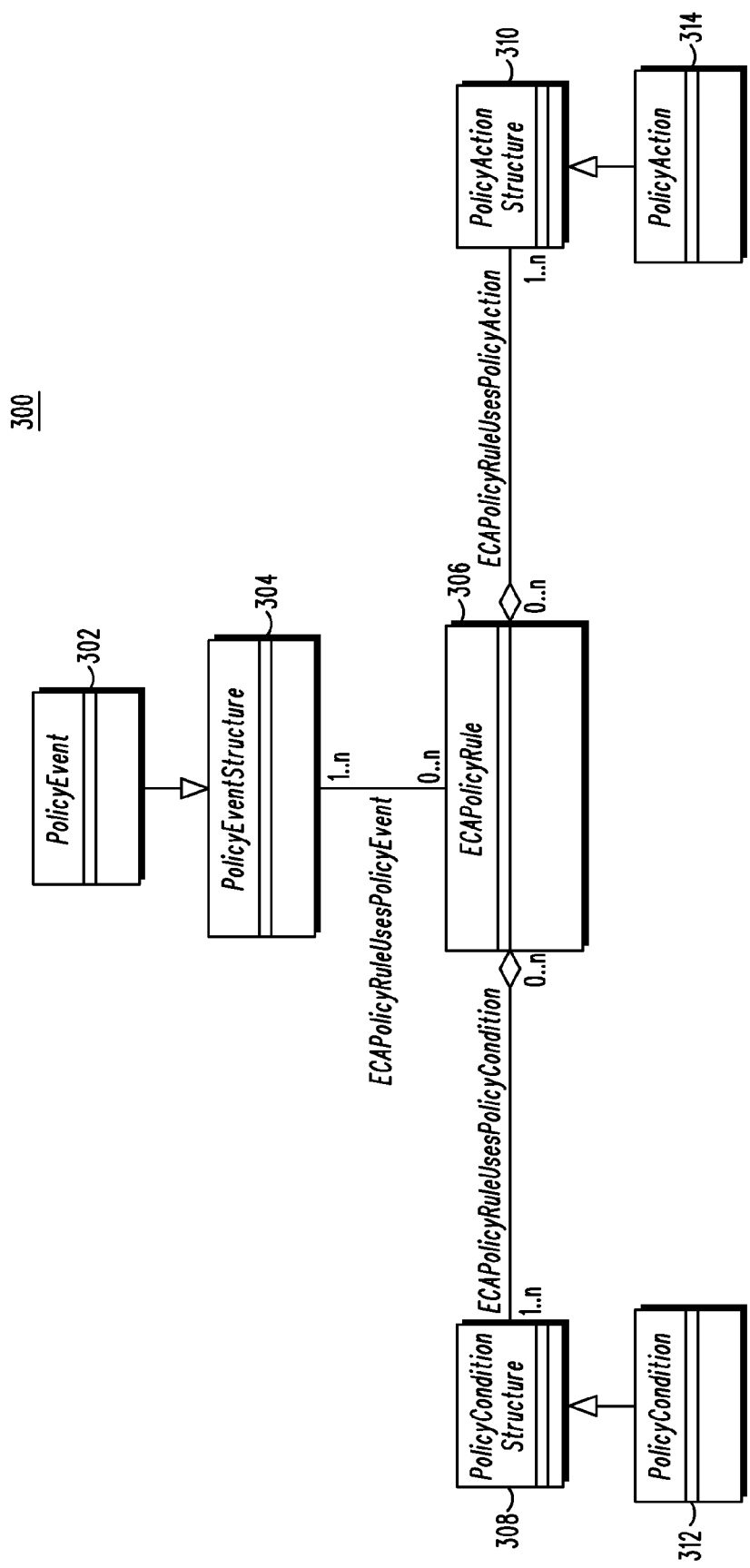
FIG. 3 is a simplified Unified Modeling Language fragment of policy expressed as an event-condition-action according to one embodiment of the present invention.

The ECA (Event-Condition-Action) policy model 300 is shown in FIG. 3 (represented as a UML fragment). The ECA policy model 300 shows a PolicyEvent class 302 and a PolicyEventStructure 304 coupled together with an inheritance line. An ECAPolicyRuleUsesPolicyEvent relationship exists between the PolicyEventStructure 304 and ECAPolicyRule 306 classes. FIG. 3 shows an ECAPolicyRulesUsesPolicyCondition aggregation between the PolicyConditionStructure class 308 and the ECAPolicyRule class 306. An ECAPolicyRulesUsesPolicyAction aggregation exists between the ECAPolicyRule class 306 and the PolicyActionStructure class 310. The PolicyConditionStructre class 308 has a subclass of PolicyCondition 312 and the PolicyActionStructure class has a subclass of PolicyAction 314.

At any given level of view within the policy continuum, a policy rule 116 is expressed in terms of one or more events, which trigger the evaluation of one or more conditions, and if said conditions hold true, one or more actions are taken. (Note that the latest DEN-ng model allows for an alternate set of actions to be taken if the conditions are FALSE, but this does not affect the various embodiments of the present invention.) This approach is advantageous of other approaches (commonly called condition-action or event-action) in terms of predictability and efficiency.

In order to apply a policy-continuum based approach to the operation and maintenance of an enterprise network, an understanding of the enterprise network in terms of the continuum needs to be developed. At the business level, an enterprise network is managed by the business support system ("BSS"). The business support system is that aspect of the enterprise network which is needed to support the day-to-day operation of the business. Fundamentally, this is commonly accepted to mean functions related to products and lifecycle management thereof, customer relationship management, and charging/billing functionality. More specifically, the BSS is concerned with providing the interface between the service/content/network provider and the subscriber for the purposes of establishing, fulfilling and maintaining a mutually beneficial business relationship. The BSS is modeled using a business process modeling approach and consists of a set of well defined business processes that interoperate using a set of contract-defined interfaces. Business process is further augmented through the specification and application of business policies. Business policies are modeled and implemented using ECA policy rules (see FIG. 2).

At the system view/layer 204 of the continuum reside the service management system and the system itself. The service management system is a set of interoperating processes that support the operations and maintenance of the enterprise network as a coherent system, focusing specifically on the services (both customer and network-facing) delivered by the system. The service management system acts as an interface between the business and the underlying network. The service management system is modeled as an interoperating set of computational processes that monitor and maintain the services operating within the network. The model of system is both device and technology independent.

At the network view/layer 206 of the continuum, reside the network management system and the networks that comprise the larger enterprise network. The model of the network at this layer is device independent but technology specific. By example, the network is modeled in terms of connections that support specific protocols without regards to the details of the devices at either end of the connection (e.g., the specific set of CLI and/or SNMP commands required to configure the connection). That is to say, the network devices provide support for the connections and protocols are modeled, as are those aspects of the devices directly related to network connectivity; however, the details of the devices at either end of the connection and the applications running within said devices are not. The network view focuses on the resources of the network and the utilization of those resources.

The device view 208 of the enterprise network is a further refinement of the network view where the details of the devices and the applications running on said devices becomes important. For example, this view takes specific capabilities of the devices actually being used in the network into account. The instance view 210 of the enterprise is the detailed view of the physical hardware and logical connectivity (e.g., the exact configuration commands used) that form the network; infrastructure and access devices are modeled in detail at this level, including the instance specific management protocols and agents.

As discussed above, the network manager 112 translates the preconditions, post-conditions, and invariants specified within contract-defined interface specifications into policies. This functionality within a system where policy-based mechanisms are already used represents potential for increased reliability and cycle time reductions. These gains are achieved by leveraging the conflict identification and resolution mechanisms within the policy subsystems. Additionally, this approach gives increased flexibility to service, content, and network operators in terms of enabling what would have previously been static capability being made available in a much more dynamic fashion.

The network manager 112 translates the specification of a CDI (loosely, a contract 116) into a policy-based representation for the purposes of automating deployment, activation, and access of CDI implementations within a CEE. The policy-based approach is particularly advantageous, as it enables the preconditions, post-conditions, and invariants of the design-by-contract/program-by-contract approach to be expressed in a fashion that can be changed at deployment, and continually modified over the lifecycle of the deployed functionality in a fashion that does not require costly changes to the functionality. This enables the changing business needs of the organization to be continually and correctly reflected by the preconditions, post-conditions, and invariants that formalize component orchestration.

This approach is specifically advantageous in terms of the ability to express pre-conditions, post-conditions, and invariants in the context of the view of the contract. Contracts 114 are most useful at the business 202 and system layers 204 of the policy continuum (depicted in FIG. 2), somewhat useful at the network layer 206 and significantly less useful in the device 208 and instance views 210 (where the overhead of program-by-contract is prohibitive and, in most cases, unnecessary, from the perspective of the business).

At the business level 202, a subscriber purchases a product offering (a product with an associated price) wherein the product can be considered a bundle of services. A service level agreement is associated with the product offering that defines the contractual obligations of the service/network/content provider relative to the obligations of the subscriber. The obligations of the subscriber are typically monetary, but may also include a requirement for pre-requisite products and/or services to be available. For example, a subscriber cannot subscribe to an SMS service without first having a cellular service of some type.

At the business level 202, the system is represented as a number of operating processes, with process interaction occurring at well defined interfaces, characterized using one or more contracts 114 (as in design-by-contract). These contracts 114 represent the external interface to the business functionality supported by each process. The functionality offered by the business view contracts 114 operates on, and produces information that is directly related to, third party entities such as customers, partners, suppliers, and the agreements between the service provider and these third party entities. This includes, but is not limited to, products, customer facing services, service level agreements, customer visible resources (both physical and logical), billing records, location, trouble tickets, order requests, etc.

At the system level 204, each obligation of each business contract 114 is examined to ensure that its meaning is clear to the system. Often, a business contract obligation may need to be translated into terms understood by the system. General examples include the linking of one or more system concepts (e.g., objects) to a business concept, or the augmentation of information supplied at the business view with additional information added by the (more detailed) system view. As a specific example, the availability of service instances and sufficient service capacity to support the usage requests of the client are simply not available at the business view, but must be added before subsequent views can be examined to ensure that the request is feasible. At this point, the obligations expressed within the contract are verified.

The translation of business view entities into system view entities involves the augmentation of existing entities with additional information, the decomposition of business view entities into corresponding (supporting) system view entities, and the introduction of new entities that are specific to the system view. In general these three basic types of transformations occur whenever information at any given layer of the continuum is translated to a representation that is meaningful at the next layer of the continuum.

To apply a policy-based approach to program-by-contract, the network manager 112 establishes a mapping between the programmatic invocation of function (i.e., the contract 114) and the event-condition-action tuple of policy-based management as defined in Strassner, J., "Policy-Based Network Management", Morgan Kaufman Publishers: 2003, ISBN 1-55860-859-1. A contract 114 can be described as a collection of fundamental behaviors with each behavior being refined and/or protected by operations such as invocation, precondition, functional behaviors, and post conditions.

In one embodiment, the network manager 112, maps an invocation 422, 522 (or request for invocation) of a contract 416, 516 to an event 424, 525 of a policy rule 414, 514. Therefore, an event 424, 524 is the invocation of functionality. An invocation can be a remote or local request for execution of a service or a portion of a service (or other functionality) in a system. The precondition 426, 526 of the contract 416, 516 is mapped to the condition 428, 528 of the policy rule 416, 516. A condition can reference parameters that need be evaluated. The functional behavior 430, 530 of the contract 416, 516 is mapped to the action 432, 536 of the policy rule 416, 516. Therefore, the action 432 is the requested functionality. A functional behavior is a type of capability and is a statement to perform something without regards for what that something is.

Figure 4:
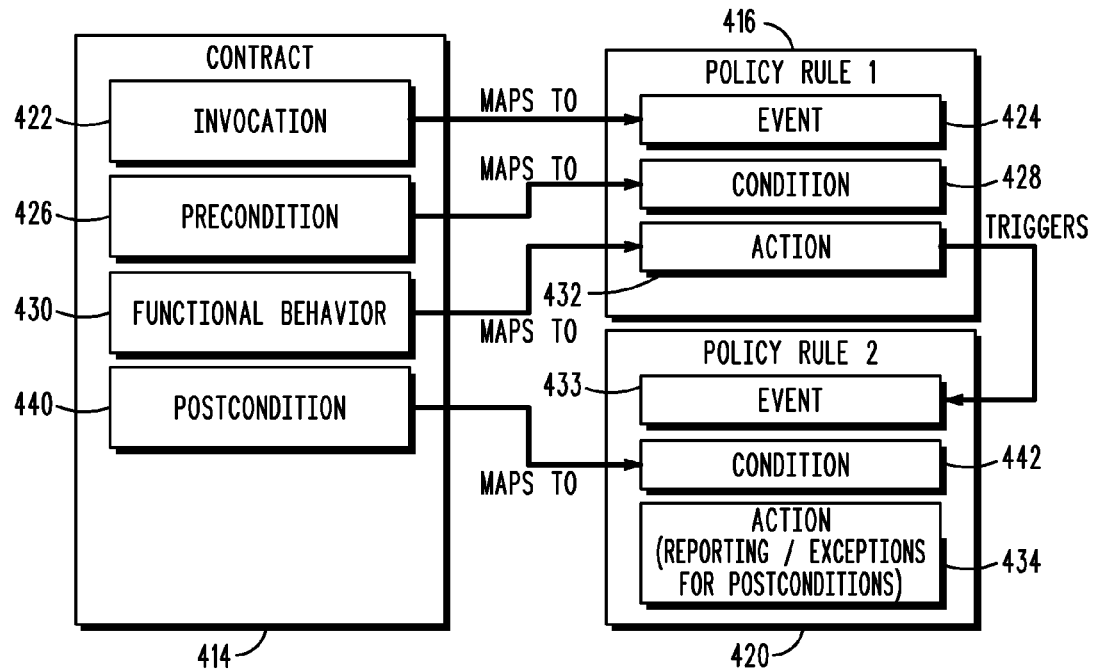
FIG. 4 is a diagram illustrating an example of mapping a contract to policy rules according to one embodiment of the present invention.

FIG. 4 shows the simpler of two implementations based on DEN-ng, which currently has the most advanced event-condition-action available. In FIG. 4, the simpler implementation of a DEN-ng policy rule is used (ON <event clause> IF <condition clause is TRUE> THEN <execute action clause>. Hence, if the policy condition 428 (Meyer's precondition 426) is not met, this can be communicated via the generation of an exception 434 that represents the "precondition-not-met" as a runtime-error in a second policy rule 420. Alternatively, a DEN-ng policy rule 516 can be implemented as ON <event clause> IF <condition clause is TRUE> THEN <evaluate action set 1> (536) ELSE <evaluate action set 2> (538). This is shown in FIG. 5.

In either of the above cases, the network manager 112 monitors the invariant starting at the invocation (event 422, 522) and ending after the post-condition 440, 540 (the action ensures that the post-condition holds true or otherwise throws an exception) is executed. The handling of the guarantees embodied within post-conditions 440, 540 is accomplished in a similar fashion. In the case of post-conditions 440, 540, the "invocation complete" (often referred to as the "return") is the event 433 that is used to trigger the post-condition policy rule 420; the contract's post-condition 440, 540 is directly mapped to the post-condition policy rule's condition 442, and the action 434 is to return an indication of successful completion. This technique works only when the guarantees made can be met. If for some reason the guaranteed post-conditions cannot be met, the problem becomes more complicated. This can be alleviated by the specification of exceptions. Exceptions are generated for appropriate cases that violate the guarantees of the contract. For example, an exception is (emitted or thrown) when the preconditions have been satisfied but for some reason the post-conditions cannot be guaranteed.

In a modern CEE, the deployment of a component requires the creation and/or modification of a descriptive information entity which is commonly referred to as a deployment descriptor within the art. The network manger 112 establishes a linkage between a concrete deployable service defined within a deployment descriptor and the contract defined preconditions and post conditions using an additional or augmented deployment descriptor. This is then used by a policy-aware CEE to implement at runtime the verification of preconditions, post-conditions, and invariants. The additional information embedded within each deployment descriptor is used to associate services to preconditions and post-conditions that are implemented not as static entities, but as dynamic policies. This has the advantage of enabling the deployed services in the system to react to changes in business policies without requiring the need to redeploy services in order to the associated preconditions and post-conditions.

Figure 5:
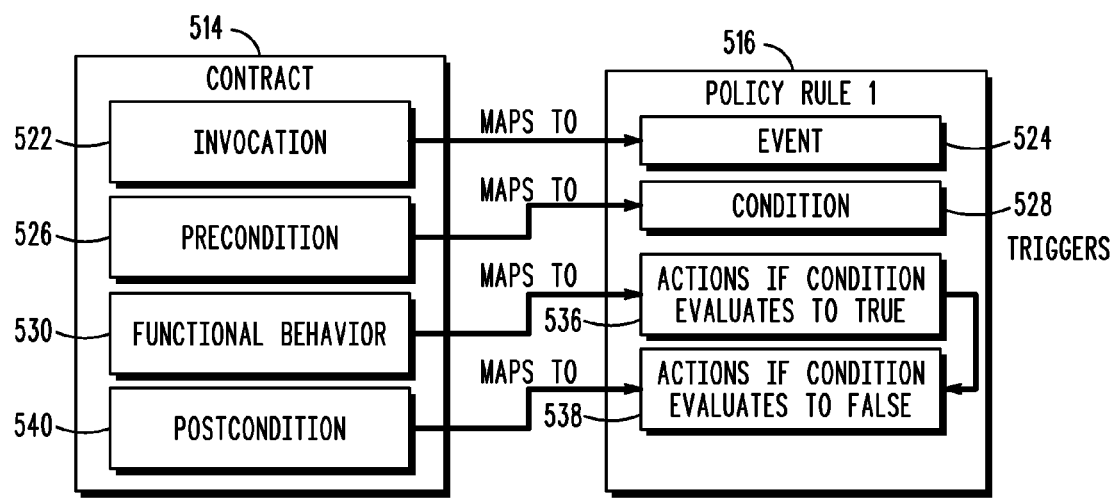
FIG. 5 is an example of mapping a contract to more complex policy rules according to one embodiment of the present invention.

As can be seen in FIG. 4 and FIG. 5, the mapping of the concepts embodied in design-by-contract/program-by-contract can be easily mapped to the concept of an ECA policy. At the business level 202, contracts 114 are specified for specified business processes in terms of the service being rendered. A service, content, or network provider wishing to make use of a commercial off the shelf component also has a set of business policies that are also taken into account when considering an interaction across a contract defined interface. The implementation of design-by-contract/program-by-contract enables the policy conflict detect and resolution mechanisms embodied within the policy subsystem to be used to identify and resolve any conflicts between the preconditions, post-conditions and invariants associated to contract defined interfaces and the business policies of the service, content, and/or network operator.

The following discussion illustrates one example of automated translation of contracts 114 to policies 116 according to one embodiment of the present invention. The following example is discussed with respect to a next-generation converged networking environment where sophisticated users are expecting a seamless user experience that allows access to all subscribed services where ever, and whenever possible. Such a networking environment is illustrated in FIG. 6.

Figure 6:
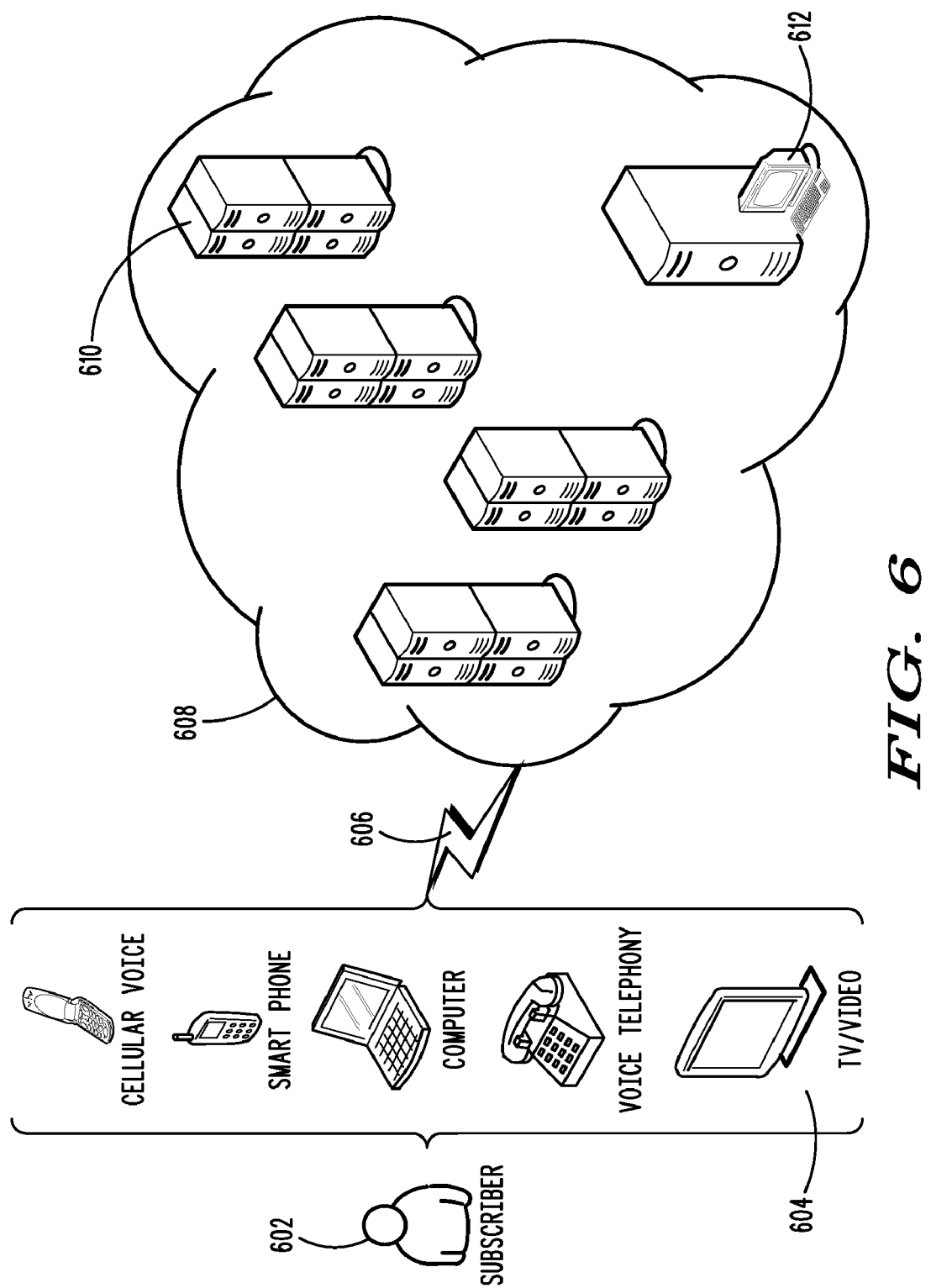
FIG. 6 is a diagram illustrating one example of a networking environment according to one embodiment of the present invention.
Figure 7:
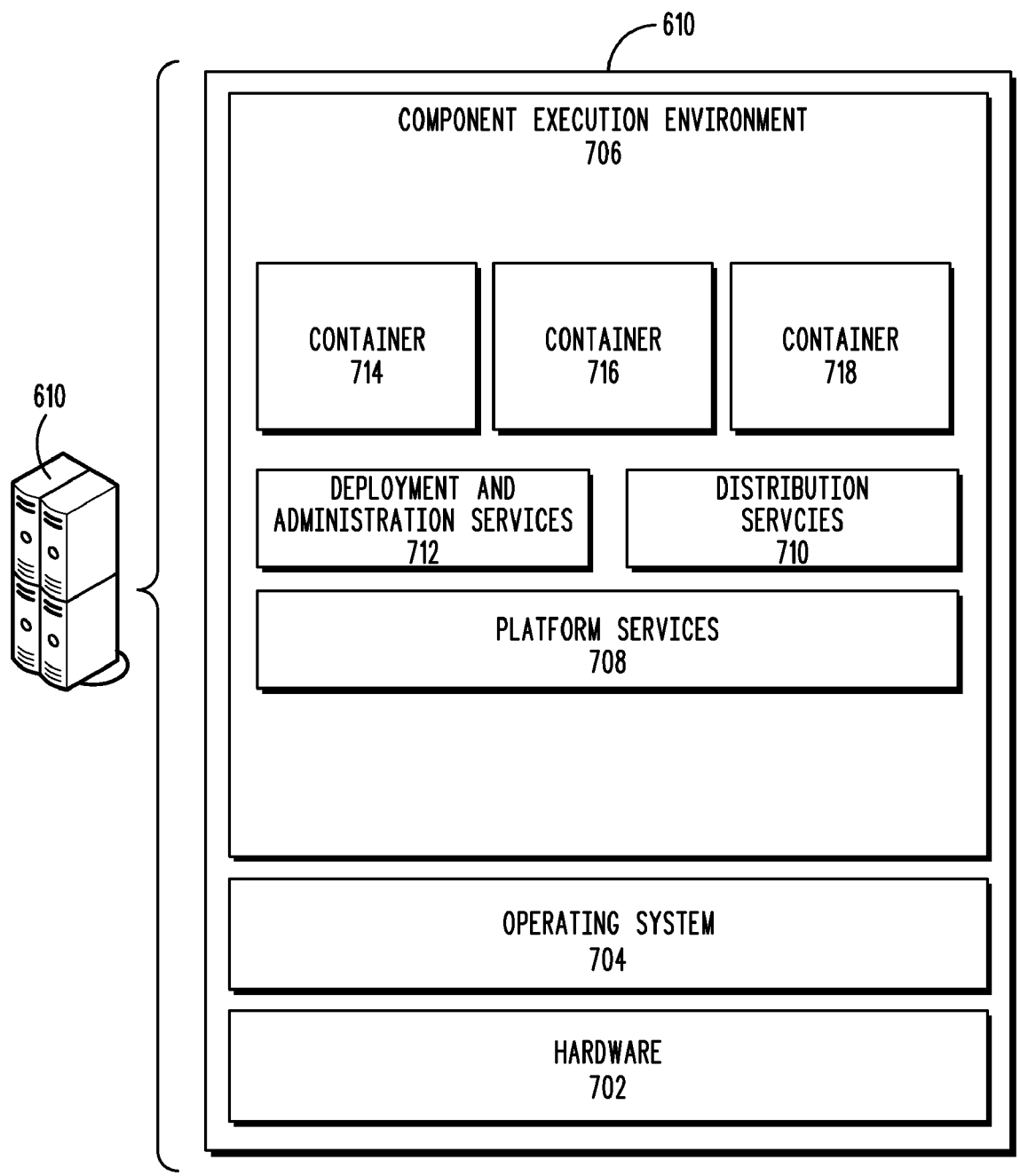
FIG. 7 is a block diagram illustrating a component execution environment reference architecture according to one embodiment of the present invention.

In FIG. 6, a subscriber 602 employs services spanning multiple access devices 604 across one or more communication links 606 to a network 608 operated by a network/service provider. The services offered to the subscriber may be provided by the network/service provider or by external providers (e.g., application and content providers) and are hosted on some number of application servers 610 interconnected within or to the network 608. Note that in the case of content providers, the external providers may have application servers hosted in networks that are connected to, and exist in, some form of well defined trust relationship with the network and application servers of the network/service provider, rather than hosting application components on application servers hosted directly within the network 608. Each application server 610 provides a component execution environment. One possible reference architecture for a component execution environment is illustrated in FIG. 7. Note that this only one example of a reference architecture for a component execution environment.

In FIG. 7, the application server 610 has on or more component execution environments 706. In this example, the component execution environment 706 includes three top level internal containers, each of which may contain zero or more components. Within the component execution environment are three classification of services; platform services 708, distribution services 710, and deployment and administration services 712. Platform services 708 allow access to operating system 704 and hardware services 702 of the platform. The distribution services 710 provide for directory, communications, database, location, and other common distributed application and distribution services within the component execution environment for use by components hosted in the various internal component containers. Finally, the deployment and administration services 712 allow control over the component execution environment and the deployment of components. The container 714, 716, 718 is used by the component execution environment 706 to host instances of contract implementations (which are deployed via components). The container 714, 716, 718 provides the component execution environment 706 with services to ensure the reliability, availability, security, and general good behavior of contract implementation instances.

In a component-based software environment, such as JEE or the CCM, the container 714, 716, 718 provides an isolation between the implementation of a service and the consumer of the service. That is to say, the implementation is accessed through the boundary of the container 714, 716, 718. While this introduces a layer of indirection, it enables the implementation of declarative role based access control and transaction management (amongst other things). In the various embodiments of the present invention, it is at this boundary that the preconditions, post-conditions, and invariants associated to a contract 114 can be checked. This approach is described in Teiniker, E.; Lechner, R.; Schmoelzer, G.; Kreiner, C.; Kovacs, Z.; and Weiss, R. "Towards a Contract Aware CORBA Component Container," compsac, pp. 545-550, 29th Annual International Computer Software and Applications Conference (COMPSAC'05) Volume 1, 2005, which is hereby incorporated by reference in its entirety, from the perspective of a declarative approach that is based on changes to deployment descriptors. The approach discussed by Teiniker et al. is limited by the fact that it is a declarative approach based on OCL which requires redeployment of components whenever a change is required to preconditions, post-conditions, or invariants.

In one embodiment the automatic translation mechanism, e.g., network manager 112, can be embodied in the form of a policy-enabled container ("PEC 112"), which is a specialization of the general purpose container 714 illustrated in FIG. 7. A policy-enabled container is a container that has been modified to be able to understand the association of policy rules to an interface or operation within an interface. This association can be accomplished through the use of named policy rules, which avoid the need to explicitly embed the specification of the preconditions and/or post-conditions within the deployment descriptors associated to a component.

In the embodiment where the automatic translation mechanism is embodied in the form of a PEC 112, a policy-server 612 is introduced in to the converged enterprise network of FIG. 6. The PEC 112 implements the well-understood functionality of a policy decision point and policy execution point (see, for example, Strassner, J., "Policy-Based Network Management", Morgan Kaufman Publishers: 2003, ISBN 1-55860-859-1). In this environment, the contract defined interfaces that exist at and between processes defined within the business process model are translated into policy, according to the mapping discussed above with respect to FIGS. 4 and 5, as appropriate. When the PEC 112 intercepts the request to invoke functionality, the PEC 112 checks the policy conditions 428 that have been associated to the interface/operation via the mapping of the preconditions 426 defined by the contract 114, as well as those derived from any business policies explicitly related with a request for the functionality manifest in the contract implementation. If those conditions evaluate to true and the policy representation of FIG. 4 is used, then the invocation is allowed. Once the invocation is complete, the PEC 112 checks the conditions 442 that are mapped from the contract post-condition 440. A PEC 112 also continually checks invariants associated to an interface over the active lifetime of a contract implementation in a similar fashion. Errors are handled by throwing the appropriate exception(s). (Similar arguments can be made for the policy representation of FIG. 5).

Operational Flow for Mapping Contracts to Policies

Figure 8:
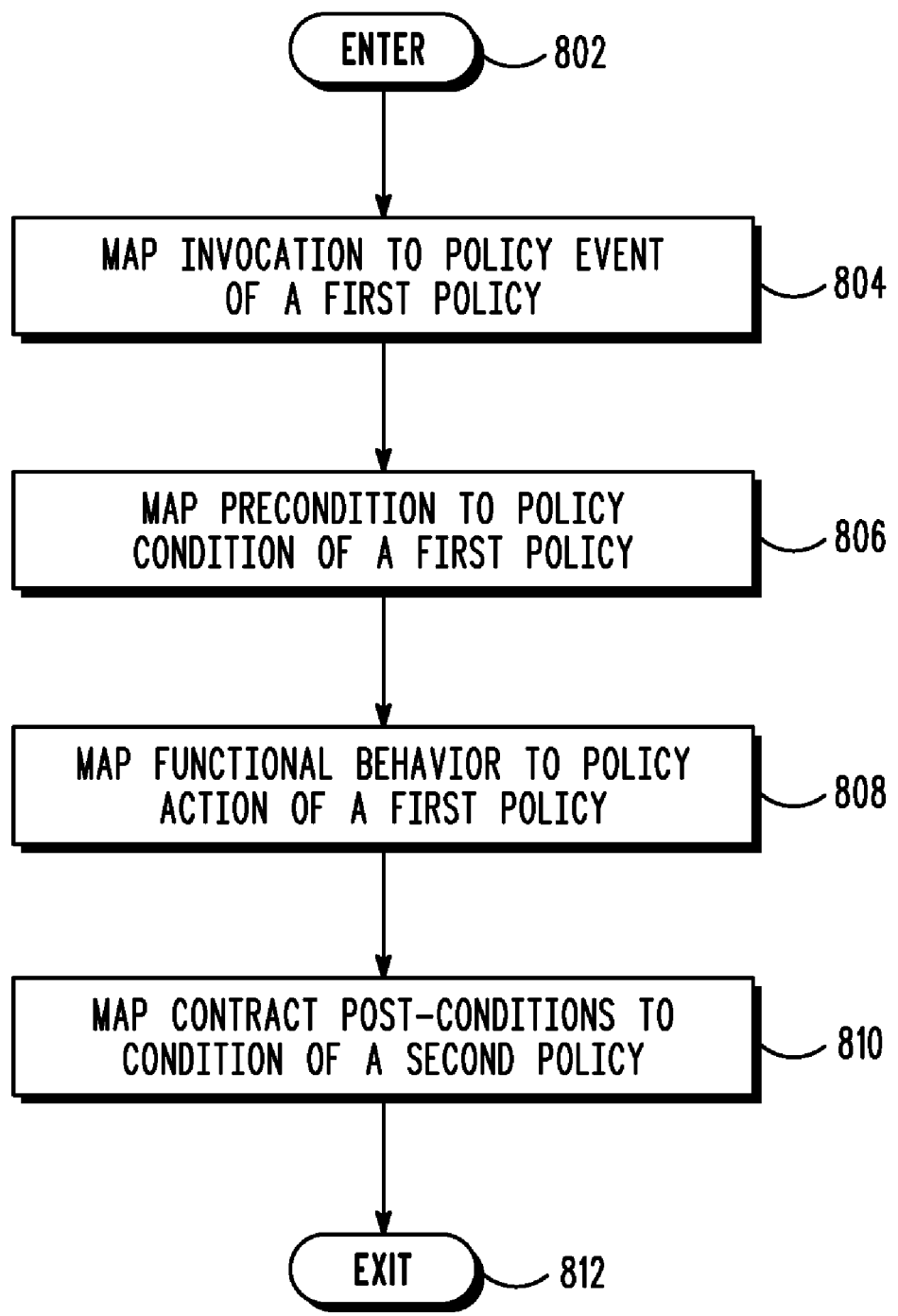
FIG. 8 is an operational flow diagram illustrating one process of mapping a contract to one or more policy rules according to one embodiment of the present invention.

FIG. 8 is an operational flow diagram illustrating one process for mapping contracts 114 to policies 116. The operational flow begins at step 802 and flows directly to step 804. The network manager 112, at step 804, maps an invocation 422 (or request for invocation) to a policy event 424. The network manager 112, at step 806, maps a contract 114 precondition 426 to the policy condition 428. The requested functionality (functional behavior) 430 of the contract 114, at step 808, is mapped the policy action 432, where the policy action 432 triggers the event 433 of another policy rule 432. The contract post-conditions 440, at step 810, are mapped directly to the condition 442 the policy rule 420. The control flows then exits at step 812.

Operational Flow for Translating Contract Defined Interfaces into Policy

Figure 9:
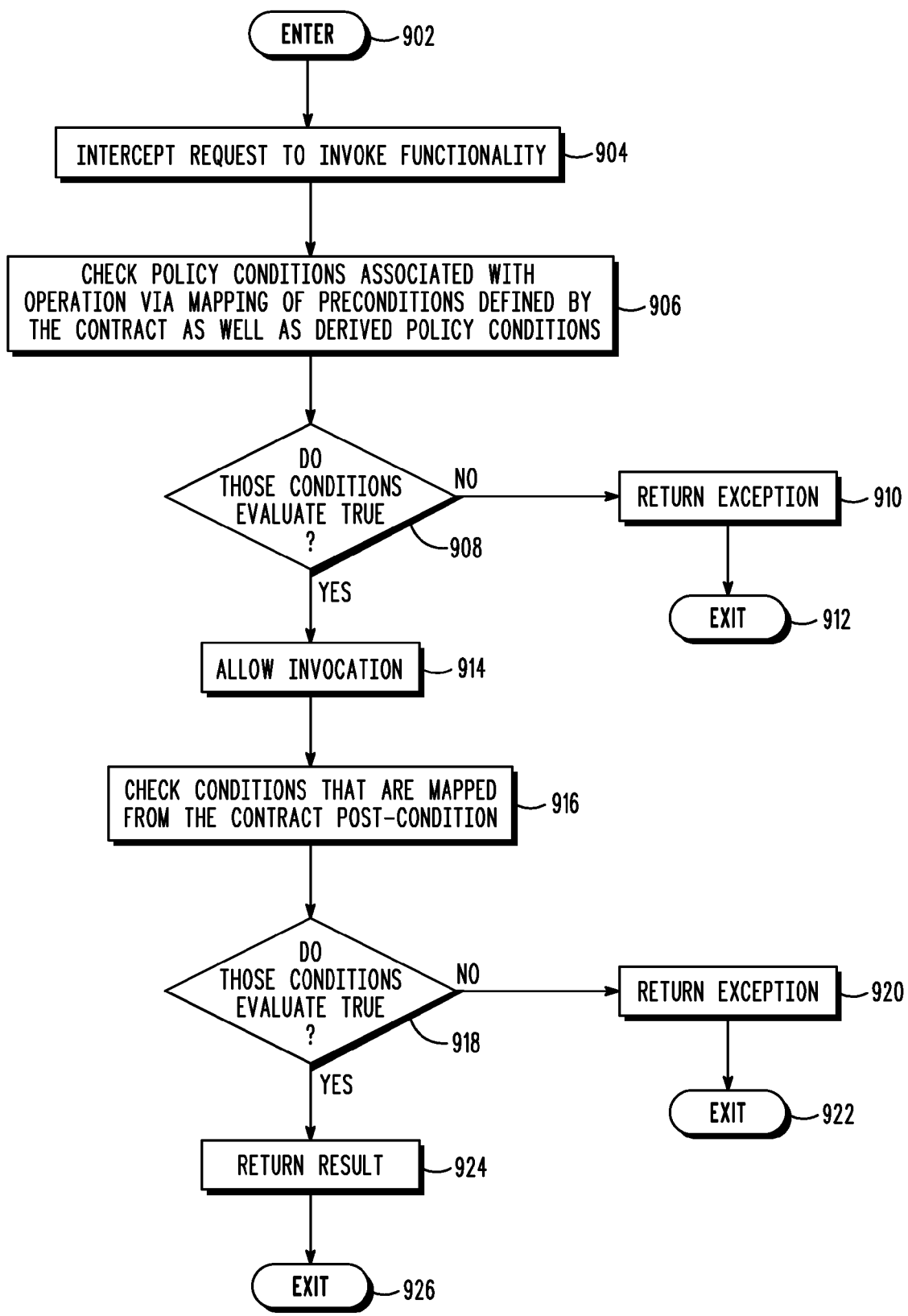
FIG. 9 is an operational flow diagram illustrating one process of translating contract defined interfaces into policy according to one embodiment of the present invention.

FIG. 9 is an operational flow diagram illustrating one process for translating contract defined interfaces into policy. The operational flow begins at step 902 and flows directly to step 904. The network manager 112, at step 904, intercepts requests to invoke functionality. The network manager 112, at step 906, checks the policy conditions 428 that have been associated to the interface/operation via the mapping of the preconditions 426 defined by the contract 114, as well as those derived from any business policies explicitly related with a request for the functionality manifest in the contract implementation. The network manager 112, at step 908, determines if those conditions evaluate true. If the result of this determination is negative, the network manager 112, at step 910, returns an exception. The control flow then exits at step 912. If the result of this determination is positive, the network manager 112, at step 914, allows the invocation.

Once the invocation is complete, the network manager 112, at step 916, checks the conditions 442 that are mapped from the contract post-condition 440. The network manager 112, at step 918, determines if these conditions evaluate true. If the result of this determination is negative, the network manager 112, at step 920, returns an exception. The control flow then exits at step 922. If the result of this determination is positive, the network manager 112, at step 924, returns the result of the invocation being allowed. The control flow then exits at step 926.

Computing System

Figure 10:
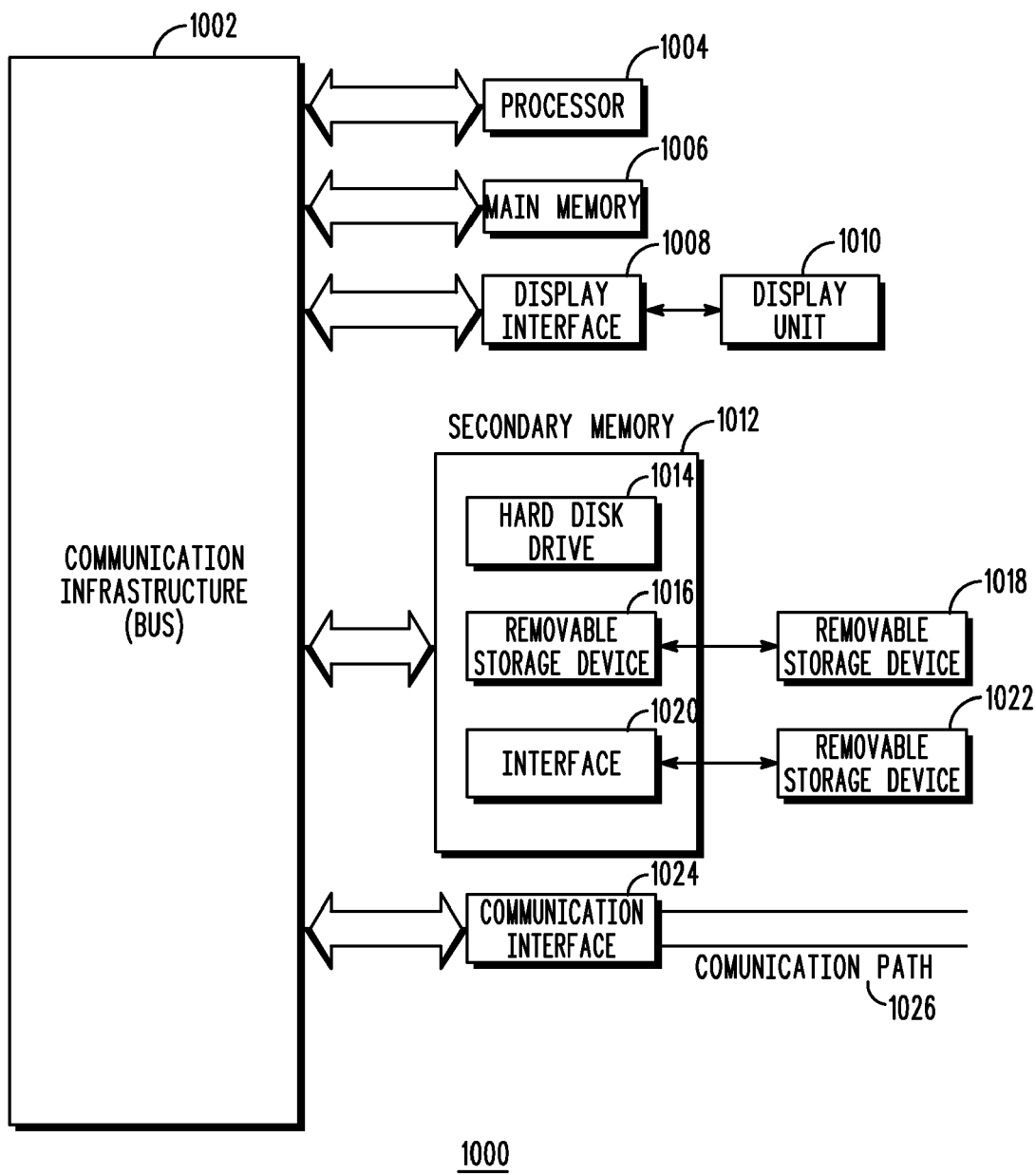
FIG. 10 is a block diagram illustrating a detailed view of an information processing system, according to one embodiment of the present invention.

FIG. 10 is a high level block diagram illustrating a more detailed view of a computing system 1000 such as the information processing system 102 useful for implementing the network manager 112 according to embodiments of the present invention. The computing system 1000 is based upon a suitably configured processing system adapted to implement an exemplary embodiment of the present invention. For example, a personal computer, workstation, or the like, may be used.

In one embodiment of the present invention, the computing system 1000 includes one or more processors, such as processor 1004. The processor 1004 is connected to a communication infrastructure 1002 (e.g., a communications bus, crossover bar, or network). Various software embodiments are described in terms of this exemplary computer system. After reading this description, it becomes apparent to a person of ordinary skill in the relevant art(s) how to implement the invention using other computer systems and/or computer architectures.

The computing system 1000 can include a display interface 1008 that forwards graphics, text, and other data from the communication infrastructure 1002 (or from a frame buffer) for display on the display unit 1010. The computing system 1000 also includes a main memory 1006, preferably random access memory (RAM), and may also include a secondary memory 1012 as well as various caches and auxiliary memory as are normally found in computer systems. The secondary memory 1012 may include, for example, a hard disk drive 1014 and/or a removable storage drive 1016, representing a floppy disk drive, a magnetic tape drive, an optical disk drive, and the like. The removable storage drive 1016 reads from and/or writes to a removable storage unit 1016 in a manner well known to those having ordinary skill in the art.

Removable storage unit 1016, represents a floppy disk, a compact disc, magnetic tape, optical disk, etc. which is read by and written to by removable storage drive 1016. As are appreciated, the removable storage unit 1016 includes a computer readable medium having stored therein computer software and/or data. The computer readable medium may include non-volatile memory, such as ROM, Flash memory, Disk drive memory, CD-ROM, and other permanent storage. Additionally, a computer medium may include, for example, volatile storage such as RAM, buffers, cache memory, and network circuits. Furthermore, the computer readable medium may comprise computer readable information in a transitory state medium such as a network link and/or a network interface, including a wired network or a wireless network that allow a computer to read such computer-readable information.

In alternative embodiments, the secondary memory 1012 may include other similar means for allowing computer programs or other instructions to be loaded into the computing system 1000. Such means may include, for example, a removable storage unit 1022 and an interface 1020. Examples of such may include a program cartridge and cartridge interface (such as that found in video game devices), a removable memory chip (such as an EPROM, or PROM) and associated socket, and other removable storage units 1022 and interfaces 1020 which allow software and data to be transferred from the removable storage unit 1022 to the computing system 1000.

The computing system 200, in this example, includes a communications interface 1024 that acts as an input and output and allows software and data to be transferred between the computing system 1000 and external devices or access points via a communications path 1026. Examples of communications interface 1024 may include a modem, a network interface (such as an Ethernet card), a communications port, a PCMCIA slot and card, etc. Software and data transferred via communications interface 1024 are in the form of signals which may be, for example, electronic, electromagnetic, optical, or other signals capable of being received by communications interface 1024. The signals are provided to communications interface 1024 via a communications path (i.e., channel) 1026. The channel 1026 carries signals and may be implemented using wire or cable, fiber optics, a phone line, a cellular phone link, an RF link, and/or other communications channels.

In this document, the terms "computer program medium," "computer usable medium," "computer readable medium", "computer readable storage product", and "computer program storage product" are used to generally refer to media such as main memory 1006 and secondary memory 1012, removable storage drive 1016, and a hard disk installed in hard disk drive 1014. The computer program products are means for providing software to the computer system. The computer readable medium allows the computer system to read data, instructions, messages or message packets, and other computer readable information from the computer readable medium.

Computer programs (also called computer control logic) are stored in main memory 1006 and/or secondary memory 1012. Computer programs may also be received via communications interface 1024. Such computer programs, when executed, enable the computer system to perform the features of the various embodiments of the present invention as discussed herein. In particular, the computer programs, when executed, enable the processor 1004 to perform the features of the computer system.

NON-LIMITING EXAMPLES

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A method for managing a network, the method comprising:
   receiving, at a network that uses a component based architecture, at least one contract comprising one or more components, wherein the contract is a collection of fundamental behaviors with each behavior being further refined and/or protected by a set of operations associated with the contract;
   mapping a first operation in the set of operations associated with the contract to a policy rule event associated with at least one policy rule;

mapping a second operation in the set of operations associated with the contract to at least one policy rule condition associated with the policy rule;

mapping a third operation in the set of operations associated with the contract to a policy rule action associated with the policy rule wherein the policy rule action triggers an implementation of at least one other policy rule, wherein the policy rule action is associated with the policy rule event of the other policy rule; and mapping a fourth operation in the set of operations associated with the contract to a policy rule condition associated with the other policy rule;

wherein the first operation is an invocation operation, wherein the invocation operation is one of a remote and local request for execution of a service;

wherein the second operation is a precondition operation, wherein the precondition operation specifies parameters that must be true for a method to be called;

wherein the third operation is a functional behavior operation, wherein a functional behavior specifies a set of actions to be performed based on the invocation operation; and wherein the fourth operation is a post-condition operation, wherein the post-condition operation specifies what is to occur when the method successfully completes.

2. The method of claim 1 further comprising:

receiving a request to invoke functionality as defined by the contract;

analyzing the policy rule condition, which is associated with the functionality by the mapping of the second operation to the policy rule condition;

determining, in response to the analyzing, if the policy rule condition has been satisfied; and returning an exception in response to the policy rule condition failing to be satisfied.

3. The method of claim 2 further comprising:

determining that the policy rule condition has been satisfied; and allowing the request to invoke functionality in response to the policy rule condition being satisfied.

4. The method of claim 3 further comprising:

instantiating the other policy rule in response to the request to invoke functionality being allowed.

5. The method of claim 4 further comprising:

analyzing the policy rule condition associated with the other policy rule;

determining, in response to the analyzing, if the policy rule condition associated with the other policy rule has been satisfied; and returning an exception in response to the policy rule condition failing to be satisfied.

6. The method of claim 4 further comprising:

determining, in response to the analyzing, that the policy rule condition associated with the other policy rule has been satisfied; and returning a result associated with allowing the request to invoke functionality in response to the policy rule condition associated with the other policy rule having been satisfied.

7. The method of claim 6 further comprising:

monitoring an invariant associated with the contract in response to the request to invoke functionality being allowed; and monitoring the invariant associated with the contract in response to the policy rule condition associated with the other policy rule having been satisfied.

8. The method of claim 1 wherein a component is a unit of independent deployment, is a unit of third party composition, and possesses a non-persistent state.

9. An information processing system for managing a network, the information processing system comprising:

a memory;

a processor communicatively coupled to the memory; and a network manager communicatively coupled to the memory and the processor, wherein the network manager is adapted to:

receive, at a network that uses a component based architecture, at least one contract comprising one or more components, wherein the contract is a collection of fundamental behaviors with each behavior being further refined and/or protected by a set of operations associated with the contract;

map a first operation in the set of operations associated with the contract to a policy rule event associated with at least one policy rule;

map a second operation in the set of operations associated with the contract to at least one policy rule condition associated with the policy rule;

map a third operation in the set of operations associated with the contract to a policy rule action associated with the policy rule wherein the policy rule action triggers an implementation of at least one other policy rule, wherein the policy rule action is associated with the policy rule event of the other policy rule; and map a fourth operation in the set of operations associated with the contract to a policy rule condition associated with the other policy rule;

wherein the first operation is an invocation operation, wherein the invocation operation is one of a remote and local request for execution of a service;

wherein the second operation is a precondition operation, wherein the precondition operation specifies parameters that must be true for a method to be called;

wherein the third operation is a functional behavior operation, wherein a functional behavior specifies a set of actions to be performed based on the invocation operation; and wherein the fourth operation is a post-condition operation, wherein the post-condition operation specifies what is to occur when the method successfully completes.

10. The information processing system of claim 9 wherein the network manager is further adapted to:

receive a request to invoke functionality as defined by the contract;

analyze the policy rule condition, which is associated with the functionality by the mapping of the second operation to the policy rule condition;

determine, in response to the analyzing, if the policy rule condition has been satisfied;

return an exception in response to the policy rule condition failing to be satisfied;

allow the request to invoke functionality in response to the policy rule condition being satisfied; and instantiate the other policy rule in response to the request to invoke functionality being allowed.

11. The information processing system of claim 10 wherein the network manager is further adapted to:

analyze the policy rule condition associated with the other policy rule;

determine, in response to the analyzing, if the policy rule condition associated with the other policy rule has been satisfied;

return an exception in response to the policy rule condition failing to be satisfied; and return a result associated with allowing the request to invoke functionality in response to the policy rule condition associated with the other policy rule having been satisfied.

12. The information processing system of claim 11 wherein the network manager is further adapted to:

monitor an invariant associated with the contract in response to the request to invoke functionality being allowed; and monitor the invariant associated with the contract in response to the policy rule condition associated with the other policy rule having been satisfied.

13. The information processing system of claim 10 wherein a component is a unit of independent deployment, is a unit of third party composition, and possesses a non-persistent state.

* * * * *